US 9,346,524 B2

(12) United States Patent
Dubois et al.

(10) Patent No.: US 9,346,524 B2
(45) Date of Patent: May 24, 2016

(54) UNIVERSAL VERTICAL SPORT BOARD DISPLAY SYSTEM

(71) Applicants: Andrew Dubois, Marina Del Rey, CA (US); David Dubois, Marina Del Rey, CA (US)

(72) Inventors: Andrew Dubois, Marina Del Rey, CA (US); David Dubois, Marina Del Rey, CA (US)

( * ) Notice: Subject to any disclaimer, the term of this patent is extended or adjusted under 35 U.S.C. 154(b) by 29 days.

(21) Appl. No.: 14/278,222

(22) Filed: May 15, 2014

(65) Prior Publication Data

US 2015/0329185 A1    Nov. 19, 2015

(51) Int. Cl.
*A47B 81/00* (2006.01)
*B63B 35/79* (2006.01)
*A63C 11/00* (2006.01)
*A63C 17/01* (2006.01)
*F16M 13/02* (2006.01)
*A47B 43/00* (2006.01)
*A47F 5/08* (2006.01)

(52) U.S. Cl.
CPC .............. *B63B 35/7946* (2013.01); *A63C 11/00* (2013.01); *A63C 17/017* (2013.01); *F16M 13/02* (2013.01); *A47B 43/006* (2013.01); *A47B 81/00* (2013.01); *A47F 5/0892* (2013.01)

(58) Field of Classification Search
USPC .......... 248/317; 211/85.7, 70.5, 87.01, 106.01
See application file for complete search history.

(56) References Cited

U.S. PATENT DOCUMENTS

| | | | | |
|---|---|---|---|---|
| 4,878,585 A | * | 11/1989 | Orestano | 211/87.01 |
| 5,014,955 A | * | 5/1991 | Thompson | 248/309.1 |
| 5,107,995 A | * | 4/1992 | Simpson | 211/60.1 |
| 5,120,012 A | * | 6/1992 | Rosenau | 248/201 |
| 5,141,116 A | | 8/1992 | Mojica | |
| 5,833,079 A | * | 11/1998 | Roberts | A47B 81/00 |
| | | | | 211/105.1 |
| 6,457,619 B1 | * | 10/2002 | Werner | B60P 3/40 |
| | | | | 211/70.1 |
| 7,451,968 B2 | | 11/2008 | Geldert | |
| 7,654,554 B1 | * | 2/2010 | Scaturro et al. | 280/610 |
| 7,721,900 B2 | | 5/2010 | Waterman | |
| 7,896,175 B1 | | 3/2011 | Corr et al. | |
| 7,950,535 B1 | | 5/2011 | Schmid | |
| 8,210,366 B2 | | 7/2012 | Kahn | |
| 2006/0016842 A1 | * | 1/2006 | Lu | 224/600 |
| 2006/0180728 A1 | * | 8/2006 | Abrantes | 248/328 |
| 2008/0128319 A1 | * | 6/2008 | Noble Colin | A47F 5/10 |
| | | | | 206/745 |
| 2009/0001034 A1 | | 1/2009 | Hazan | |
| 2009/0032485 A1 | * | 2/2009 | Berry | 211/85.7 |

* cited by examiner

*Primary Examiner* — Alfred J Wujciak (57) ABSTRACT

A universal vertical storage and display system for multiple types, sizes and shapes of sport boards. The embodiment is wall or other vertical surface mounted. The display system comprises prefabricated bracket components which through their various arrangement, configuration and orientation exhibit sport boards in a vertical position with the primary deck face parallel to the wall, oriented inward or outward. The embodiment displays sport boards as a work of art in a safe and aesthetically pleasing manner. The display system is suitable for indoor or outdoor applications.

4 Claims, 9 Drawing Sheets

FIG. 24

UNIVERSAL VERTICAL SPORT BOARD DISPLAY SYSTEM

BACKGROUND OF THE INVENTION

1. Field of the Invention

The present invention described herein relates generally to support racks. More specifically, the present invention relates to a wall or vertical surface mounted device to support a variety of sport board types, sizes and profiles, when not in use, in a vertical position with the primary deck face parallel to the wall plane.

2. Description of Related Art

Devices disclosed in the prior art relate to wall or vertical surface mounted sport board racks. These include devices patented and published in patent application publications. These devices generally relate to supporting specific sport board types, orientations, and arrangements. The following summary of prior art devices is deemed most relevant to the present disclosure, which are herein described for the purposes of distinguishing and differentiating the unique aspects of the present invention, and further highlighting the drawbacks existing in the prior art.

The combination of key features of the Universal Vertical Sport Board Display System distinguishes it from other storage racks. The present invention provides wall mounted prefabricated bracket components, which through various flexible arrangements and combinations, display multiple sport board types, shapes, sizes and profiles. The prefabricated bracket components are discrete in appearance and minimalist in design, projecting less than three and one half inches from the wall. The present invention displays sport boards in a vertical position with the primary board deck face parallel to the wall, oriented inward or outward. The prefabricated bracket components support sport boards independent of the wall eliminating direct contact between the supported board and the wall. The present invention displays sport boards as though they a work of art and in an aesthetically pleasing manner. The present invention is suitable for indoor or outdoor installations.

U.S. Pat. No. 5,014,955, issued May 14, 1991 to Thompson, discloses a Surfboard Holder supporting the board upside-down in a vertical orientation through the use of sling assembly suspended from a fixed wall bracket. The Thompson device supports only surfboards and further requires mounting with the board fins projecting outward. The Thompson device fails to provide essential features of the present invention, which delivers an adaptable and flexible display system capable of supporting multiple sport board types, shapes and profiles. Further, the present invention permits sport board to hang in a vertical, right-side up position, with the primary board deck face oriented inward or outward and in an aesthetically pleasing manner.

U.S. Pat. No. 5,107,995, issued Apr. 28, 1992 to Simpson, discloses a Strap For Holding a Surfboard in an upside-down vertical orientation. A single support strap located on the outside face of the board permits the board to come into direct contact with the supporting wall surface. The Simpson device is specifically designed to support only surfboards. The Simpson device fails to provide the essential key features of the present invention which provides a wall mounted universal vertical sport board display system capable of supporting multiple sport board types in an up-right vertical orientation with the primary deck face parallel to the wall in an aesthetically pleasing manner. In addition, the present invention eliminates direct contact between the board and wall support, protecting both and preventing damage to either.

U.S. Pat. No. 5,141,116 issued Aug. 25, 1992 to Mojica, discloses a Surfboard Storage Rack for storing multiple numbers of sport boards in the vertical position or horizontal position. Both rack positions mount the sport board perpendicular to the supporting wall exposing only the edges to view. The inherent design of the Mojica device requires substantial wall area for installation and projects a considerable distance for the wall. Sport boards mounted in the vertical position rely on the floor for support and may subject the board tail to damage. The Mojica device fails to demonstrate the essential key features of the present invention which provides a wall mounted universal vertical sport board display system capable of supporting multiple sport board types in a vertical position with the primary deck face parallel to the wall, oriented inward of outward. The present invention supports the sport board independent from the wall and/or floor and requires minimum wall space. The discrete and minimal appearance of the present invention displays each sport board in a visually appealing manner, without exposing the oversized visible bracket assembly of the Mojica device.

U.S. Patent Application No. 20090001034 A1, published Jan. 1, 2009 to Hazan, discloses a Hook Device for Hanging Surfboard in the vertical position in a manner which relies on the pin of the surfboard leash plug for support. While demonstrating a unique surfboard display system, the Hazan device fails to provide several key features of the present invention. The Hazan device is not universally capable of supporting many types of sport boards, nor is it capable of displaying a surfboard in an upright orientation. Additionally, the Hazan device requires surfboards be hung with the primary deck face oriented toward the supporting wall, which conceals the primary deck face from view.

U.S. Pat. No. 7,451,968 B2 issued Nov. 18, 2008 to Geldert, discloses a Rack for Securing a Variety of Objects for a Variety of Purposes. The Geldert device provides a horizontal or vertical display apparatus using a friction type clamping device between vise bodies for securing sport boards. The Geldert device reties on the pressure of the clamping mechanism for support, a system not suitable to smaller narrower sport boards. The Geldert device also requires significant wall area to support the bracket assembly and is highly visible. While providing a unique sport board display system, the Geldert device requires a preset wall width for attaching the armature which while conducive for large boards, overpowers and wastes wall space for smaller, narrower board types. The objectionable appearance of this oversized armature is clearly visible in each installation case. The present invention provides a visually discrete display system of fabricated components flexible and adaptable to the shapes and profiles of each sport board instance.

U.S. Pat. No. 7,721,900 B2 issued May 25, 2010 to Waterman, discloses a Sportboard Storage Rack System for single or multiple boards, which relies on the width and profile thickness of the board for stability. The Waterman device requires each individual board type have a specifically designed apparatus for that instance. The Waterman device fails to provide flexibility and adaptability for displaying multiple board shapes, sizes and profiles with a single system of standardized prefabricated bracket components as demonstrated by the present invention. The Waterman device is highly visible in most installation instances and does not permit the display of either face of the sport board without direct contact with the supporting wall surface.

U.S. Pat. No. 7,896,175 B1, issued Mar. 1, 2011 to Corr, et al, discloses a Weight Activated Storage Device providing a vertical display system relying on a mechanical apparatus activated by the weight of the board for attachment. The Corr, et al, device is primarily for elongated sport boards meeting certain weight requirements for secure activation of the device. The Corr, et al, device fails to provide key features of the present invention, such as universal adaptability to support multiple sport board regardless of their type, shape, profile and weight, and sizes, including both elongated and short boards U.S. Pat. No. 7,950,535 B1, issued May 31, 2011 to Schmid, discloses a Skateboard Deck Display System for hanging only skateboards in a vertical position by removing the truck assembly and using the anchor holes of the board to secure the deck to a hanging frame apparatus. The Schmid device requires partial disassembly of the skateboard in order to install the board in the display system. The Schmid device fails to provide key features of the present invention, such as universal adaptability to support multiple sport board types, shapes and profiles. The present invention also eliminates direct contact between the board and supporting wall when the deck faces inward. The Schmid device is oversized in order to provide adequate length for hanging multiple skateboards side by side. The present invention provides a visually discrete display system of prefabricated components flexible and adaptable to multiple shapes and profiles of sport board instances. The present invention does not require disassembly of the skateboard for use.

U.S. Pat. No. 8,210,366 B2, issued Jul. 3, 2012 to Kahn, discloses a Universal Sport Board Rack for storing sport boards and sporting equipment. The Kahn device stores sport boards in a horizontal position with the board canted slightly and the upper edge in direct contact with the supporting wall surface. While demonstrating a unique sport board display system, the Kahn device fails to demonstrate the two key features of the present invention, which provides a wall mounted universal vertical sport board display system capable of supporting a multiple board types, shapes and sizes in a vertical position with the primary deck face parallel to the wall in an aesthetically pleasing manner. In addition, the present invention prevents direct contact between the sport board and supporting wall.

It is submitted that the present invention is substantially divergent in key features and design elements from the disclosed prior art, and consequently it is clear that there is a need in the art for an improvement to sport board hanging and displaying devices. In this regard the present invention substantially fulfills these needs.

BRIEF SUMMARY OF THE INVENTION

Advancements in technology and performance have greatly expanded professional and recreational sport boards currently available in the marketplace. Additionally, their acquisition represents a substantial financial investment and instills a significant sense of pride of ownership for the user. Equal to performance in the final selection decision is the branded visual appeal and appearance of the sport board. The Universal Vertical Sport Board Display System offers a unique device capable of securing and storing sport boards in a wall mounted vertical position. The sport board primary deck face is oriented parallel to the wall and offers the flexibility of facing inward or outward. Further, the present invention transcends these utilitarian functions and provides a system for displaying sport boards as a work of art in a discrete visually appealing manner. By exposing the primary board deck face, the artful graphic appearance of the board and sense of pride of ownership to the user is fully appreciated.

Various storage and display systems are described in the prior art which provide a utilitarian device for hanging sport boards. However, in many circumstances, these systems are neither flexible nor adaptable to the wide variety of sport board sizes, shape and profiles currently available in the marketplace. These systems display sport boards with cumbersome stationary or mechanical devices, consume a significant amount of wall space and are not visually appealing.

The present invention provides a wall mounted universal vertical sport board display system of prefabricated components which through their various arrangement and combination allow for the secure vertical storage and display of a wide variety and assortment of professional and recreational sport boards. The present invention permits sport boards to be displayed in the vertical position with the primary deck face parallel to the wall, prominently exposed to view and in a visually appealing manner. The sport board can be displayed with deck facing inward or outward subject to user discretion. Further, the present embodiment offers a discrete display system which through its compact and minimalist design is hardly visible when viewing the mounted sport board.

Sport boards include, by way of example, surfboards, snowboards, skateboards, skim boards, wakeboards, water boards and many other boards. The present invention is for interior or exterior display and storage.

BRIEF DESCRIPTION OF THE SEVERAL VIEWS OF THE DRAWINGS

The features and advantages of the present invention will become apparent from the following detailed description when considered in conjunction with the accompanying drawings. The details of the present invention, both as to its structure and operation, may be gleaned in part by study of the accompanying drawings, in which like reference numerals refer to like parts, and in which.

DETAILED DESCRIPTION OF THE INVENTION

Various embodiments of the invention are described more fully hereinafter with reference to the accompanying drawings, in which some but not all embodiments of the invention are shown in the figures. Indeed, this invention may be embodied in many different forms and should not be construed as limited to the embodiments set forth herein.

The primary object of the preferred embodiment of this present invention is to provide a Universal Vertical Sport Board Display System capable of safely storing, securing and displaying sport boards. The present invention is composed of three key prefabricated wall mounted components, specifically a chord bracket 10, right bottom bracket 12 and left chord bracket 14. The arrangement of these prefabricated components on the wall permits flexibility and adaptability to accommodate many different sport board types, sizes and profiles. The present invention may be mounted to a wall or other vertical support surface. Sport boards are displayed in a vertical position with the primary board deck face mounted parallel to the wall and oriented inward or outward depending on the configuration of the prefabricated components and user preference. The present invention displays sport boards as works of art in a safe and aesthetically pleasing manner. The present invention is suitable for indoor and outdoor applications.

Sport boards include, by way of example, surfboards, snowboards, skateboards, skim boards, wakeboards, water boards, body boards, kite hoards and many other boards.

In the preferred embodiment of the present invention chord bracket 10, right bottom bracket 12 and/or left bottom bracket 14, are wall mounted and arranged in a specific location to support the specific requirements of type, size and profile of the sport board. FIG. 13 through FIG. 24 demonstrate the arrangement of the prefabricated component required to display various sport board types, sizes and profiles. Many additional arrangements of the prefabricated components are possible and suitable for supporting many other sport boards, wherein the brackets are manufactured by a plastic material.

Figures 1, 2, 3:
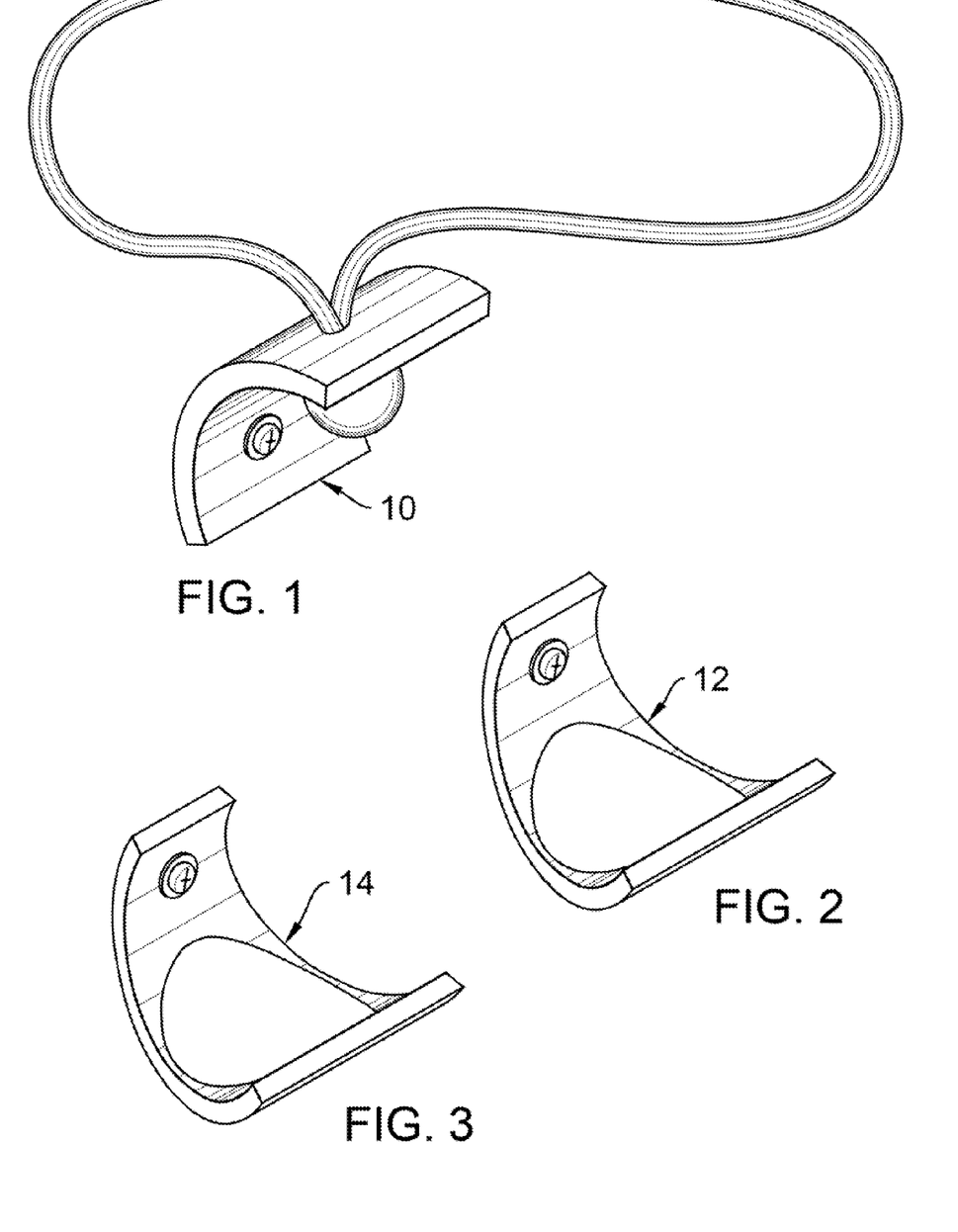
FIG. 1 is a perspective view of the chord bracket 10 of the present invention.
FIG. 2 is a perspective view of the right board bracket 12 of the present invention.
FIG. 3 is a perspective view of the left board bracket 14 of the present invention.

Referring now to the invention in more detail, FIG. 1 shows a perspective view of chord bracket 10 which contains various additional components in an assembled state. In FIG. 1, chord bracket 10 is configured in the position customarily attached to a vertical wall surface. Chord bracket 10 projects from the vertical wall and is secured with a suitable wall anchor described below. Chord bracket 10 is designed to be used together with right bottom bracket 12 and left bottom bracket 14, or singularly with right bottom bracket 12, to safely store and vertically display a sport board.

Referring to FIG. 2, illustrates a perspective view of right bottom bracket 12, which contains various additional components in an assembled state. Right bottom bracket 12 is configured in the position customarily attached to a vertical wall and is secured with a suitable wall anchor described below. Right bottom bracket 12 is designed to be used together with chord bracket 10 and may be used with left bottom bracket 14 to safely store and vertically display a sport board.

Referring to FIG. 3, illustrates a perspective view of left bottom bracket 14, which contains various additional components in an assembled state. Left bottom bracket 14 is configured in the position customarily attached to a vertical wall and is secured with a suitable wall anchor described below. Left bottom bracket 14 is designed to be used together with chord bracket 10 and right bottom bracket 12 to safely store and vertically display a sport board.

Figure 4:
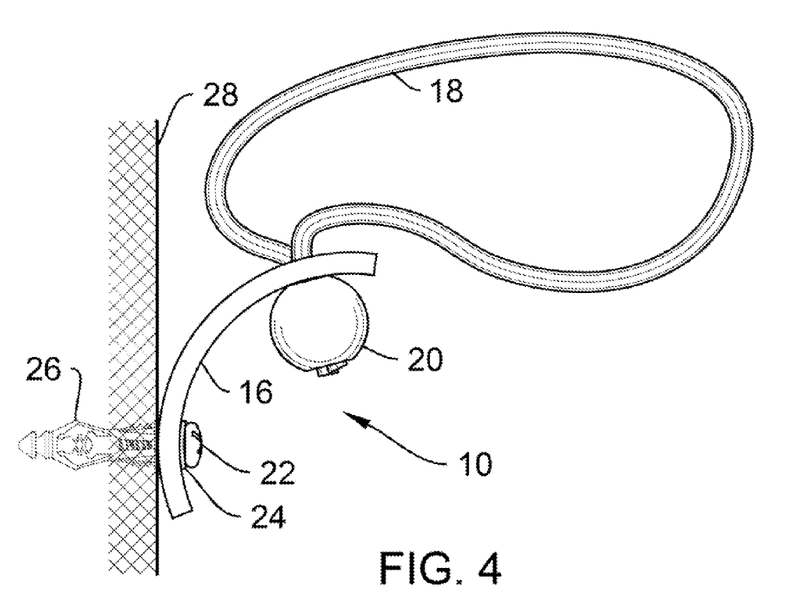
FIG. 4 is a left side view of the chord bracket 10 of the present invention.
Figure 5:
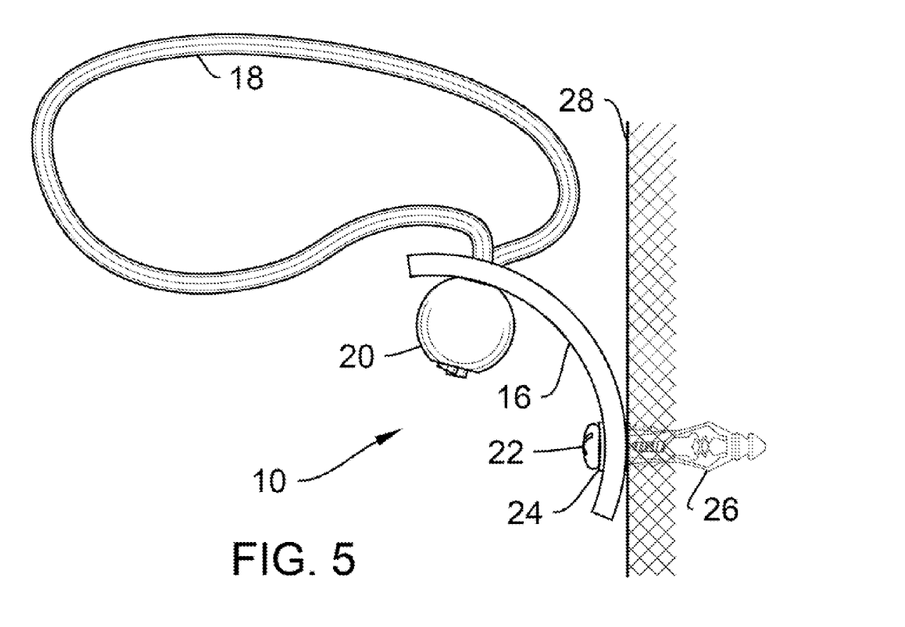
FIG. 5 is a right side view of the chord bracket 10 of the present invention.

Referring to FIG. 4 and FIG. 5, illustrating left side view (FIG. 4) and right side view (FIG. 5) of chord bracket 10, it may be seen that the preferred embodiment is composed of multiple assembled components. Chord bracket standard 16 is mounted to vertical wall material 28 using metal anchor screw 22 and metal washer 24 which engages the recessed plastic anchor 26 mounted in the wall. Flexible chord 18 comprising a nylon material, is thread through an opening in chord bracket standard 16 and is retained using chord retention device 20. Flexible chord 18 expands to permit a variety of sport board nose profiles, shapes and sizes. The projection of chord bracket 10 safely prevents the sport board from coming into direct contact with vertical wall material 28. Chord bracket 10 also serves as a means to drape and conceal from view a sport board leash between surfboard installations and vertical wall material 28.

Figure 6:
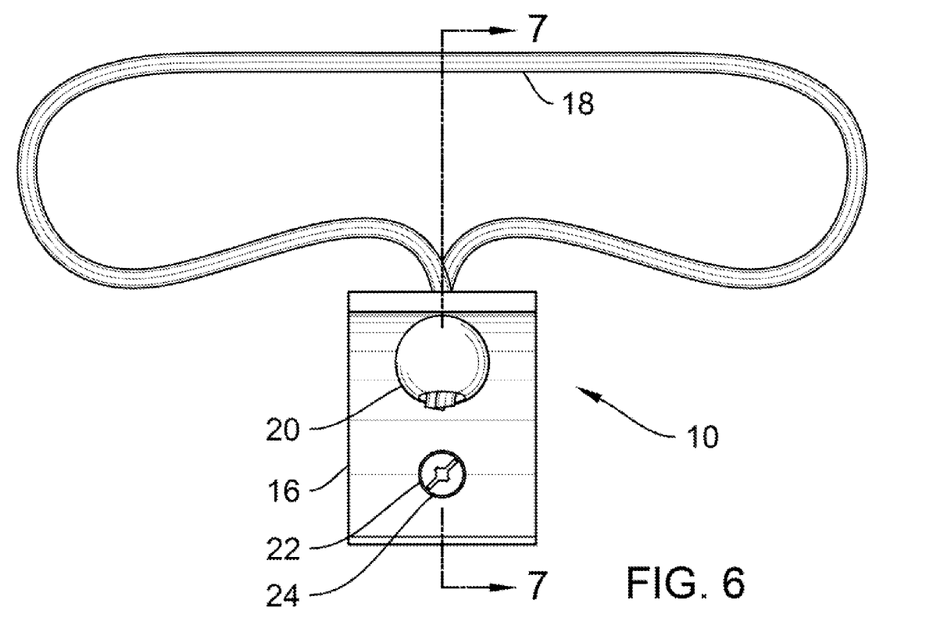
FIG. 6 is a front view of the chord bracket 10 of the present invention.

Referring to FIG. 6, illustrating a front view of chord bracket 10, it may be seen that the preferred embodiment comprises multiple assembled components. Chord bracket standard 16 is mounted to vertical wall material 28 using metal anchor screw 22 and metal washer 24. Flexible chord 18 is threaded through an opening in the chord bracket standard 16 and is retained using chord retention device 20.

Figure 7:
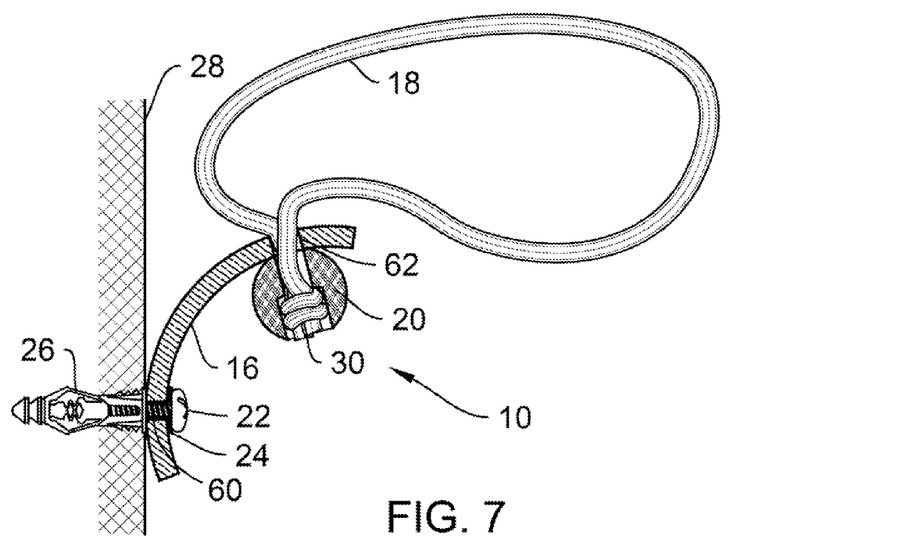
FIG. 7 is a cross section view through the chord bracket 10 of the present invention.

Referring to FIG. 7, illustrating a cross section through chord bracket 10, it may be seen that the preferred embodiment comprises multiple assembled components. FIG. 6 indicates the location of the cross section cut. Chord bracket standard 16 is mounted to vertical wall material 28 using metal anchor screw 22 through metal washer 24. Metal wall anchor 22 passes through mounting hole 60 and engages recessed plastic anchor 26 embedded within vertical wall material 28. Flexible chord 18 is threaded through chord hole 62 in chord bracket standard 16 and is retained using chord retention device 20. Countersunk within chord retention device 20 is flexible chord knot 30. Accommodation to the various sport board nose sizes and configurations is achieved by adjusting the length of flexible chord 18. Re-tying flexible chord knot 30 at a different position along the chord length adjusts the tension of flexible chord 18. Adjusting the tension of flexible chord 18 permits the sport board to be securely retained against the chord bracket 10.

Figures 8, 9, 10:
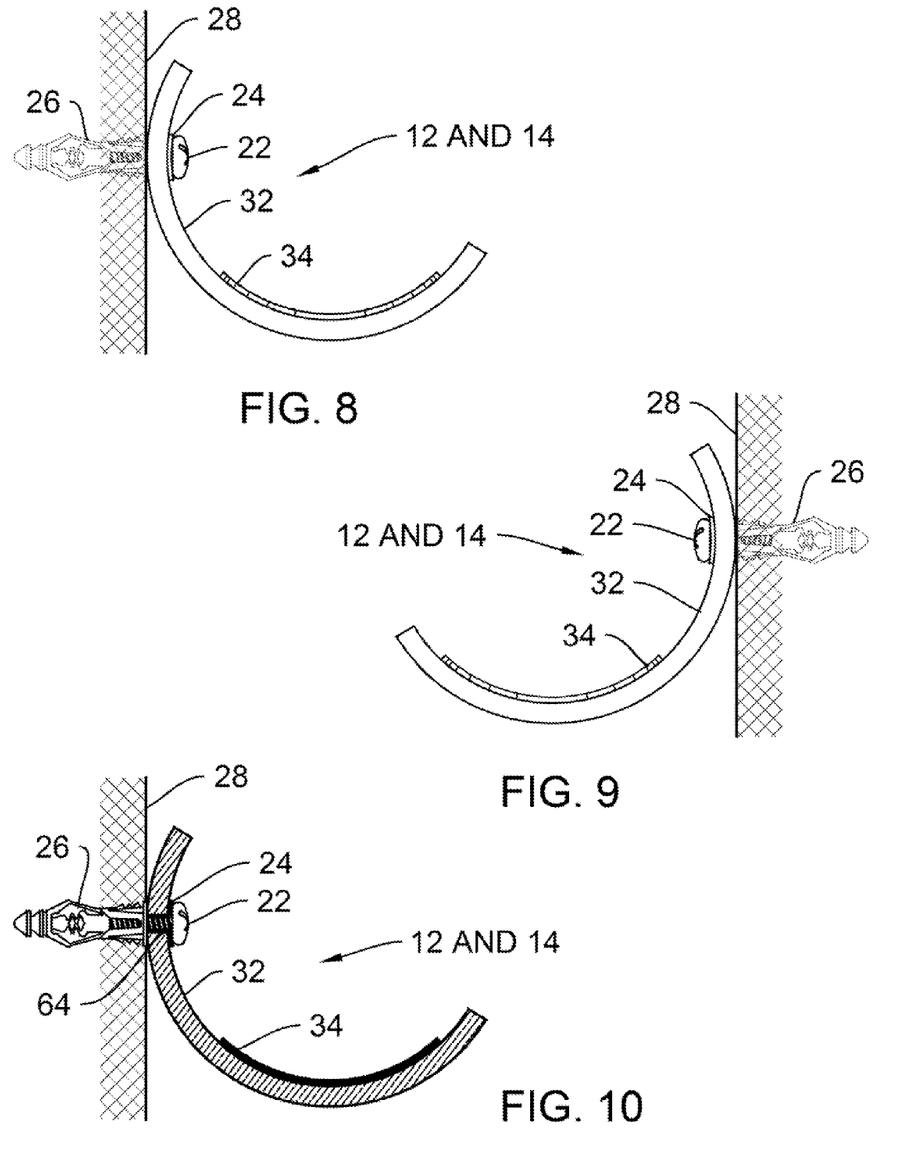
FIG. 8 is a left side view of the bottom bracket 12 and 14 of the present invention.
FIG. 9 is a right side view of the bottom bracket 12 and 14 of the present invention.
FIG. 10 is a cross section view of the bottom bracket 12 and 14 of the present invention.

Referring to FIG. 8 and FIG. 9, illustrating left side view (FIG. 8) and right side view (FIG. 9) of right bottom bracket 12 and left bottom bracket 14, it may be seen that the preferred embodiment is composed of multiple assembled components. Bottom bracket standard 32 is mounted to vertical wall material 28 using metal anchor screw 22 and metal washer 24 which engages recessed plastic anchor 26 mounted in the wall. Protective pad 34 is applied at the upper surface of bottom bracket standard 32.

Figure 11:
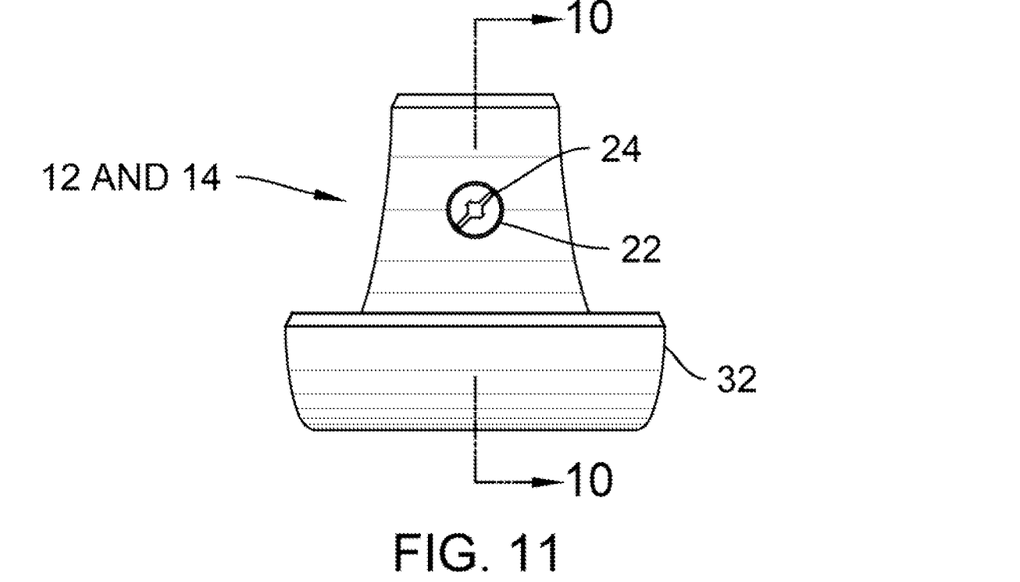
FIG. 11 is a front view of the bottom bracket 12 and 14 of the present invention.

Referring to FIG. 10, illustrating a cross section view through right bottom bracket 12 and left bottom bracket 14, it may be seen that the preferred embodiment comprises multiple assembled components. FIG. 11 indicates the location of the cross section cut. Bottom bracket standard 32 is mounted to vertical wall material 28 using metal anchor screw 22 through metal washer 24. Metal wall anchor 22 passes through mounting hole 64 and engages recessed plastic anchor 26 embedded within vertical wall material 28. The curved profile of bottom bracket standard 32 is specifically designed to accommodate a broad range of sport board tail conditions, sizes and silhouettes. Protective pad 34 is specifically shaped and placed on the upper surface of bottom bracket standard 32 to safeguard and protect body components of the supported sport board.

Referring to FIG. 11, illustrating a front view of right bottom bracket 12 and left bottom brackets 14, it may be seen that the preferred embodiment comprises multiple assembled components. Bottom bracket standard 32 is mounted to vertical wall material 28 using metal anchor screw 22 and metal washer 24.

Figure 12:
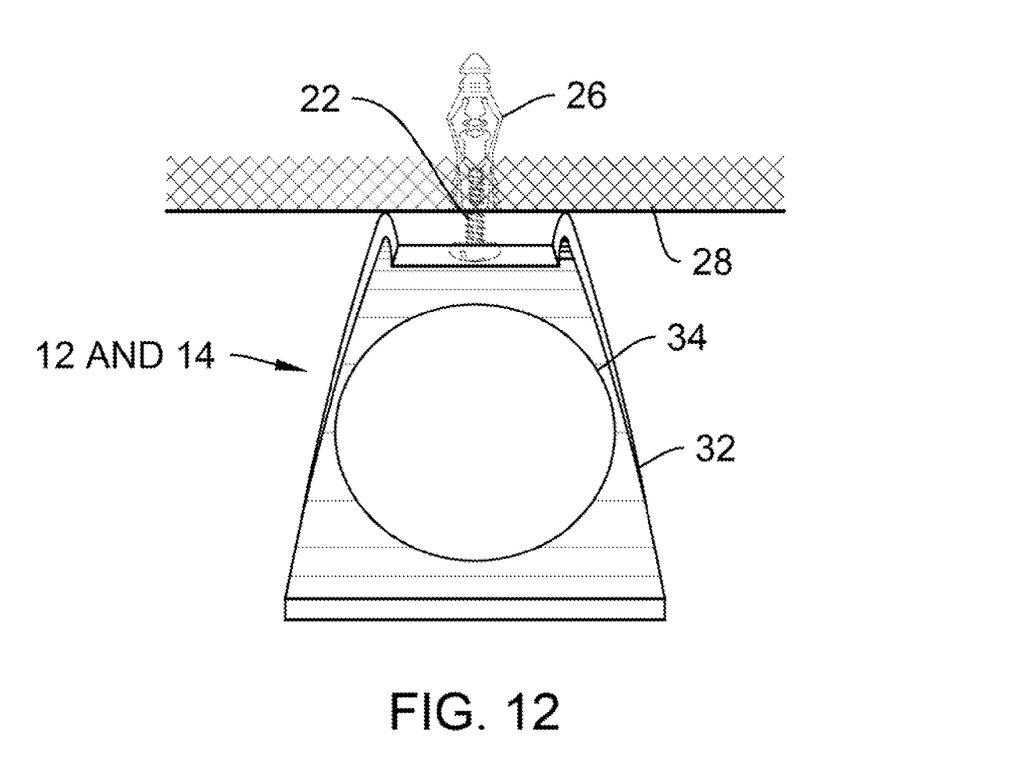
FIG. 12 is a top view of the bottom bracket 12 and 14 of the present invention.

Referring to FIG. 12, illustrating a top view of right bottom bracket 12 and left bottom brackets 14, it may be seen that the preferred embodiment comprises multiple components. Bottom bracket standard 32 is mounted to the vertical wall material 28 using the metal anchor screw 22 which engages plastic anchor 26 mounted (all obscured in view) recessed in the wall. Protective pad 34 is specifically shaped and placed on the upper surface of bottom bracket standard 32 to safeguard and protect body components of the supported sport board.

The flexible and universal application of the preferred embodiment is demonstrated in perspective views FIG. 13 through FIG. 24. By adjusting the chord bracket 10, right bottom bracket 12 and left bottom bracket 14 relationship of placement, orientation and configuration, multiple sport board types are safely stored, secured and displayed in a vertical position. The present invention displays sport boards as a work of art and in an aesthetically pleasing manner. The prefabricated components are suitable for both indoor and outdoor applications.

Figure 13:
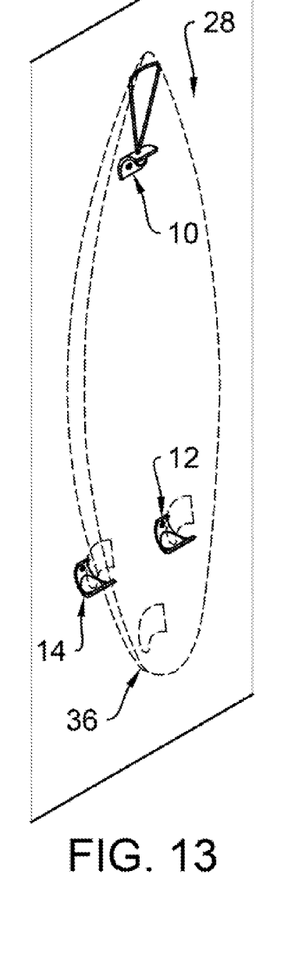
FIG. 13 is a perspective view of the present invention illustrating a multi-fin surfboard 36 mounted deck out utilizing the chord bracket 10, right bottom bracket 12 and left bottom bracket 14.

Referring to FIG. 13, illustrates a perspective view of a multi-fin surfboard 36 mounted in the vertical position with the primary deck facing outward utilizing the present invention. It may be seen that the preferred embodiment supports multi-fin surfboard 36 using chord bracket 10, right bottom bracket 12 and left bottom bracket 14, arranged in a specific pattern on vertical wall 28. Multi-fin surfboard 36 is displayed by engaging the projected board tail fins in right bottom bracket 12 and left bottom bracket 14, The multi-fin surfboard 36 nose is securely restrained against chord bracket 10 by engaging flexible chord 18. Further adjustment of chord bracket 10 is achieved through modification of the tension of flexible chord 18 by relocating the flexible chord knot 30 within the chord retention device 20.

Figure 14:
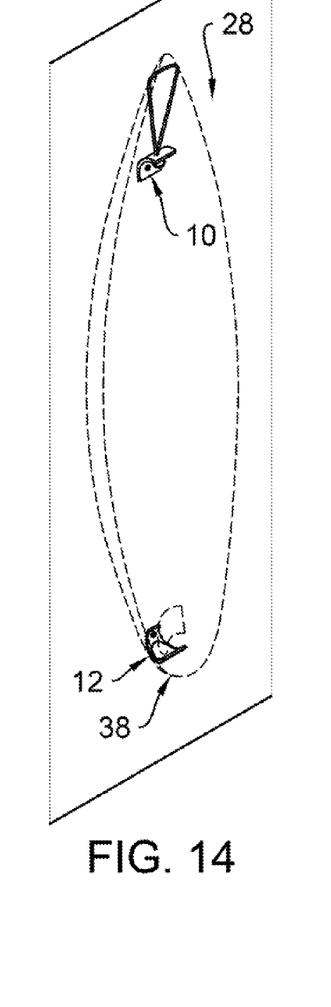
FIG. 14 is a perspective view of the present invention illustrating a mono-fin surfboard 38 mounted deck out utilizing the chord bracket 10 and right bottom bracket 12.

Referring to FIG. 14, illustrates a perspective view of a mono-fin surfboard 38 mounted in the vertical position with the primary deck facing outward utilizing the present invention. It may be seen that the preferred embodiment supports mono-fin surfboard 38 using chord bracket 10 and right bottom bracket 12, arranged in a specific pattern on vertical wall 28. Mono-fin surfboard 38 is displayed by engaging the projected board tail fin in right bottom bracket 12. The mono-fin surfboard 38 nose is securely restrained against chord bracket 10 by engaging the flexible chord 18. Further adjustment of chord bracket 10 is achieved through modification of the tension of flexible chord 18 by relocating the flexible chord knot 30 within the chord retention device 20.

Figure 15:
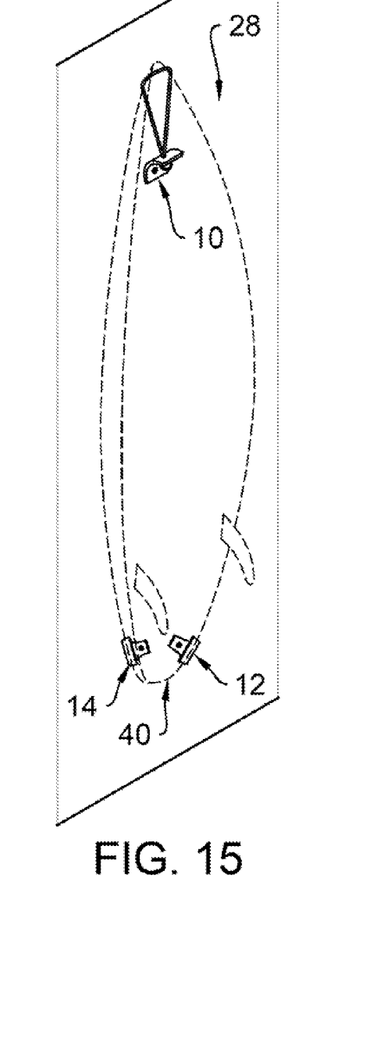
FIG. 15 is a perspective view of the present invention illustrating a surfboard 40 mounted fins out utilizing the chord bracket 10, right bottom bracket 12 and left bottom bracket 14.

Referring to FIG. 15, illustrates a perspective view of a surfboard 40 mounted in the vertical position with the primary deck facing inward utilizing the present invention. It may be seen that the preferred embodiment supports surfboard 40 using chord bracket 10, right bottom bracket 12 and left bottom bracket 14, arranged in a specific pattern and orientation on vertical wall 28. Surfboard 40 is displayed by engaging the board tail in right bottom bracket 12 and left bottom bracket 14. The surfboard 40 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference and board tail profile, surfboard 40 may be supported utilizing a single bottom bracket 12 or 14 located at the tail vertical centerline. Further dependent on user preference, surfboard 40 may be mounted while contained within a surfboard bag.

Figure 16:
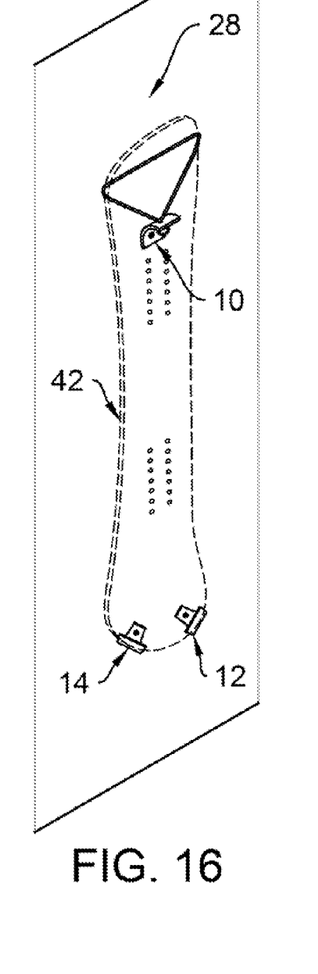
FIG. 16 is a perspective view of the present invention illustrating a snowboard 42 mounted deck out utilizing the chord bracket 10, right bottom bracket 12 and left bottom bracket 14.

Referring to FIG. 16, illustrates a perspective view of a snowboard 42 mounted in the vertical position with the primary deck facing outward utilizing the present invention. It may be seen that the preferred embodiment supports snowboard 42 using chord bracket 10, right bottom bracket 12 and left bottom bracket 14, arranged in a specific pattern and orientation on vertical wall 28. Snowboard 42 is displayed by engaging the board tail in the right bottom bracket 12 and the left bottom bracket 14. The snowboard 42 nose is securely restrained against the chord bracket 10 by engaging the flexible chord 18. Further adjustment of chord bracket 10 is achieved through modification of the tension of flexible chord 18 by relocating the flexible chord knot 30 within the chord retention device 20. Depending on user preference, snowboard 42 may be supported utilizing a single bottom bracket 12 or 14 located at the tail vertical centerline. Further dependent on user preference, snowboard 42 may be mounted while contained within a snowboard bag.

Figure 17:
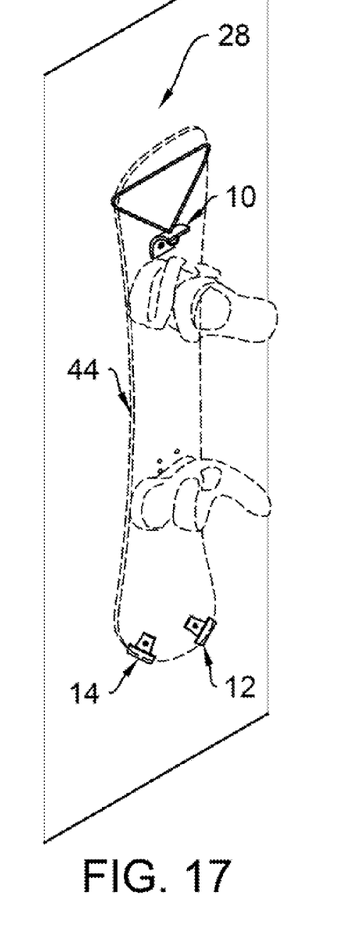
FIG. 17 is a perspective view of the present invention illustrating a snowboard 44 with bindings mounted deck out attached utilizing the chord bracket 10, right bottom bracket 12 and left bottom bracket 13.

Referring to FIG. 17, illustrates a perspective view of a snowboard 44 with attached bindings mounted in the vertical position with the primary deck facing outward utilizing the present invention. It may be seen that the preferred embodiment supports snowboard 44 utilizing chord bracket 10, right bottom bracket 12 and left bottom bracket 14, arranged in a specific pattern and orientation on vertical wall 28. Snowboard 44 is displayed by engaging the board tail in right bottom bracket 12 and left bottom bracket 14. The snowboard 44 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, snowboard 44 may be supported utilizing a single bottom bracket 12 or 14 located at the tail vertical centerline. Further dependent on user preference, snowboard 44 may be mounted while contained within a snowboard bag.

Figure 18:
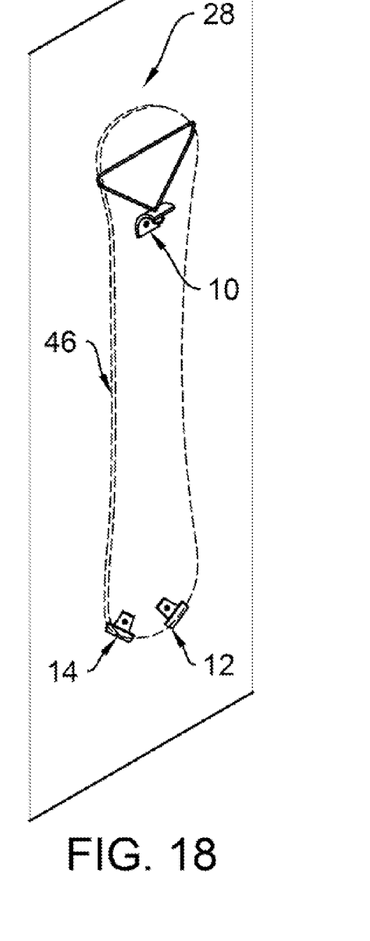
FIG. 18 is a perspective view of the present invention illustrating a snowboard 46 mounted deck in utilizing the chord bracket 10, right bottom bracket 12 and left bottom bracket 14.

Referring to FIG. 18, illustrates a perspective view of a snowboard 46 mounted in the vertical position with the primary deck facing inward utilizing the present invention. It may be seen that the preferred embodiment supports snowboard 46 utilizing chord bracket 10, right bottom bracket 12 and left bottom bracket 14, arranged in a specific pattern and orientation on vertical wall 28. Snowboard 46 is displayed by engaging the board tail in right bottom bracket 12 and left bottom bracket 14. The snowboard 46 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, snowboard 46 may be supported utilizing a single bottom bracket 12 or 14 located at the tail vertical centerline. Further dependent on user preference, snowboard 46 may be mounted while contained within a snowboard bag.

Figure 19:
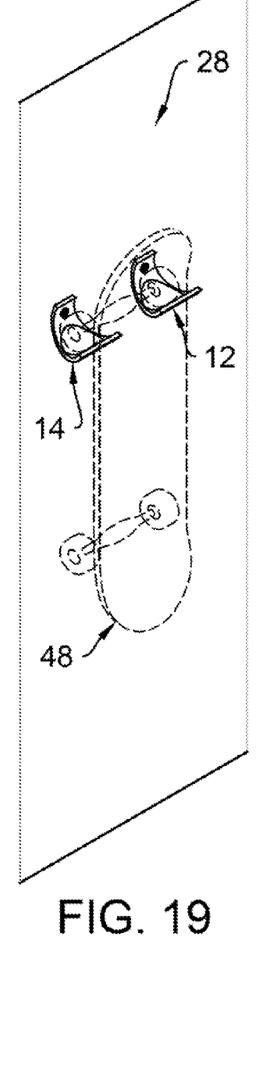
FIG. 19 is a perspective view of the present invention illustrating a skateboard 48 mounted deck out of the present invention utilizing right bottom bracket 12 and left bottom bracket 14 engaging the upper wheels of the skateboard.

Referring to FIG. 19, illustrates a perspective view of a skateboard 48 mounted in the vertical position with the primary deck facing outward utilizing the present invention. It may be seen that the preferred embodiment comprises multiple components arranged to support a skateboard 48 using a right bottom bracket 12 and left bottom bracket 14 arranged in a specific pattern on vertical wall 28. The skateboard 48 is displayed in a vertical orientation by engaging the upper board's wheel set in right bottom bracket 12 and left bottom bracket 14.

Figure 20:
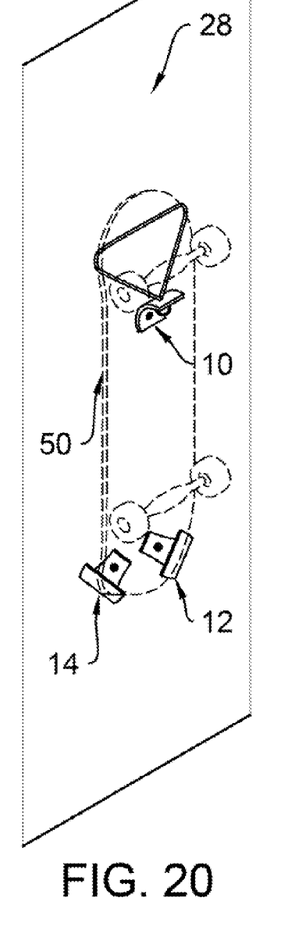
FIG. 20 is a perspective view of the present invention illustrating a skateboard 50 mounted deck in utilizing the chord bracket 10, right bottom bracket 12 and left bottom bracket 14.

Referring to FIG. 20, illustrates a perspective view of a skateboard 50 mounted in the vertical position with the primary deck facing inward utilizing the present invention. It may be seen that the preferred embodiment supports skateboard 50 utilizing chord bracket 10, right bottom bracket 12 and left bottom bracket 14, arranged in a specific pattern and orientation on vertical wall 28. Skateboard 50 is displayed by engaging the board tail in right bottom bracket 12 and left bottom bracket 14. The skateboard 50 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, skateboard 50 may be supported utilizing a single bottom bracket 12 or 14 located at the tail vertical centerline. Further dependent on user preference, skateboard 50 may be mounted while contained within a skateboard bag.

Figure 21:
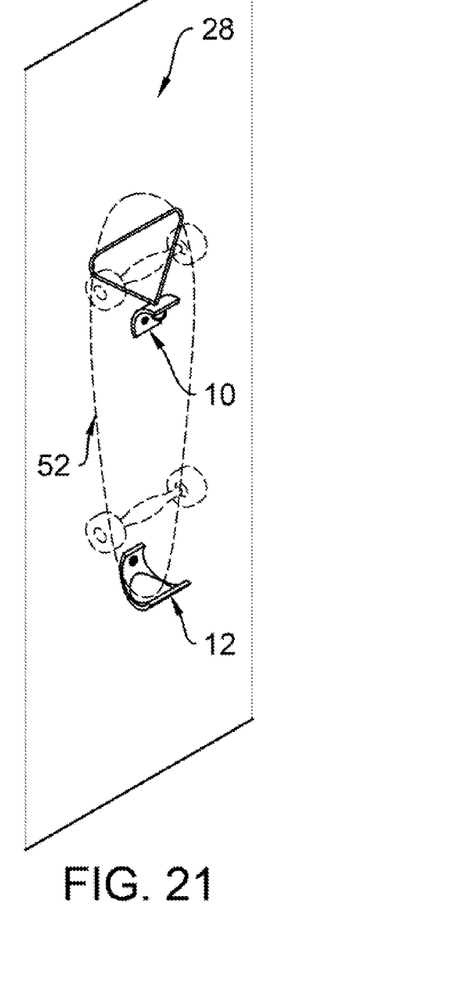
FIG. 21 is a perspective view of the present invention illustrating a shaped skateboard 52 mounted deck in utilizing the chord bracket 10 and right bottom bracket 12.

Referring to FIG. 21, illustrates a perspective view of a skateboard 52 mounted in the vertical position with the primary deck facing inward utilizing the present invention. It may be seen that the preferred embodiment supports skateboard 52 utilizing chord bracket 10 and right bottom bracket 12, arranged in a specific pattern and orientation on vertical wall 28. Skateboard 52 is displayed by engaging the board tail in right bottom bracket 12. The skateboard 52 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, skateboard 52 may be supported utilizing a bottom bracket 12 and bottom 14 located at the tail. Further dependent on user preference, skateboard 52 may be mounted while contained within a skateboard bag.

Figure 22:
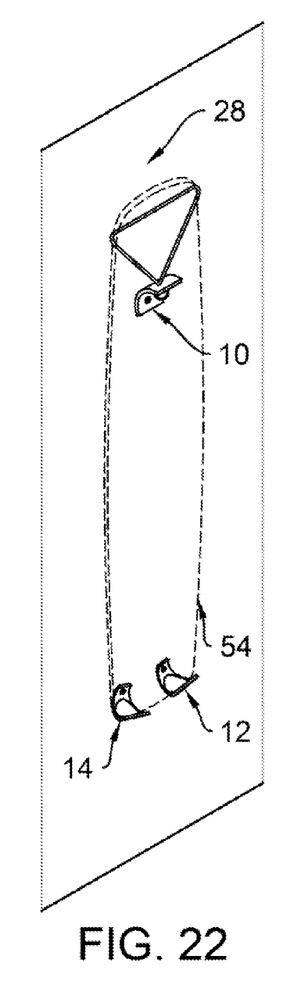
FIG. 22 is a perspective view of the present invention illustrating a sport board 54 mounted deck out utilizing the chord bracket 10, right bottom bracket 12 and left bottom bracket 14.

Referring to FIG. 22, illustrates a perspective view of a sport board 54 mounted in the vertical position with the primary deck facing outward utilizing the present invention. It may be seen that the preferred embodiment supports sport board 54 utilizing chord bracket 10, right bottom bracket 12 and left bottom bracket 14, arranged in a specific pattern and orientation on vertical wall 28. Sport board 54 is displayed by engaging the board tail in right bottom bracket 12 and left bottom bracket 14. The sport board 54 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, sport board 54 may be supported utilizing a single bottom bracket 12 located at the tail vertical centerline. Sport board 54 may be displayed with bindings attached to the board primary deck face. Further dependent on user preference, sport board 54 may be mounted while contained within a sport board bag.

Figure 23:
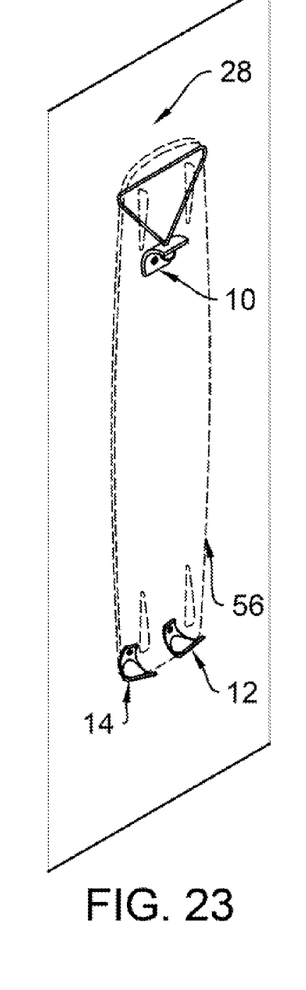
FIG. 23 is a perspective view of the present invention illustrating a sport board 56 mounted deck in utilizing the chord bracket 10, right bottom bracket 12 and left bottom bracket 14.

Referring to FIG. 23, illustrates a perspective view of a sport board 56 mounted in the vertical position with the primary deck facing inward utilizing the present invention. It may be seen that the preferred embodiment supports sport board 56 utilizing chord bracket 10, right bottom bracket 12 and left bottom bracket 14, arranged in a specific pattern and orientation on vertical wall 28. Sport board 56 is displayed by engaging the board tail in right bottom bracket 12 and left bottom bracket 14. The sport board 56 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, sport board 56 may be supported utilizing a single bottom bracket 12 located at the tail vertical centerline. Further dependent on user preference, sport board 56 may be mounted while contained within a sport board bag.

Figure 24:
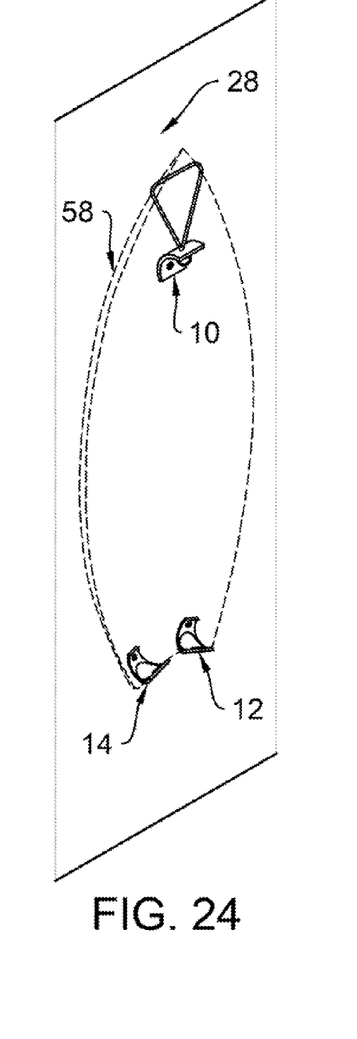
FIG. 24 is a perspective view of the present invention illustrating a skimboard 58 mounted deck in or deck out utilizing the chord bracket 10, right bottom bracket 12 and left bottom bracket 14.

Referring to FIG. 24, illustrates a perspective view of a sport board 58 mounted in the vertical position with the primary deck facing outward utilizing the present invention. It may be seen that the preferred embodiment supports sport board 58 utilizing chord bracket 10, right bottom bracket 12 and left bottom bracket 14, arranged in a specific pattern and orientation on vertical wall 28. Sport board 58 is displayed by engaging the board tail in right bottom bracket 12 and left bottom bracket 14. The sport board 58 nose is securely restrained against chord bracket 10 by engaging flexible chord 18. Further adjustment of chord bracket 10 is achieved through modification of the tension of flexible chord 18 by relocating the flexible chord knot 30 within the chord retention device 20. Depending on user preference, sport board 58 may be supported utilizing a single bottom bracket 12 located at the tail vertical centerline. Further dependent on user preference, sport board 58 may be mounted while contained within a sport board bag.

This disclosure depicts example configurations of the present invention, which is provided to facilitate understanding the features, functionality and architecture included in the invention. The present invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A sport board holder suspending a sport board on a wall, comprising:
   the sport board having a nose at one end, a bottom surface on the other end and a deck between the nose and the bottom surface,
   wherein the bottom surface having two edges opposed from each other;
   a top bracket having a nylon cord for engaging the nose of the sport board;
   a bottom right board bracket with a protective pad for engaging one edge of the bottom surface; and
   bottom left board bracket with a protective pad for engaging the other edge of the bottom surface;
   wherein the top bracket, right board bracket and left board bracket are mounted on the wall wherein the sport board is a skateboard with wheel, snowboard, surfboard, wakeboard, kiteboard, or skimboard.

2. A sport board holder of claim 1 wherein said brackets are resilient plastic.

3. A sport board holder of claim 2 wherein the brackets are attached to a mounting surface with screws, washers and plastic anchors.

4. A sport board holder of claim 3 wherein the orientation of the sport board being suspended on the wall is vertical with the deck parallel to the wall and with either the deck or bottom surface of the sport board exposed to view.

* * * * *